March 1, 1960

W. C. EDGLEY 2,926,762

CONTROL MECHANISM

Filed June 4, 1958

INVENTOR.
William C. Edgley
BY
W. C. Middleton
ATTORNEY

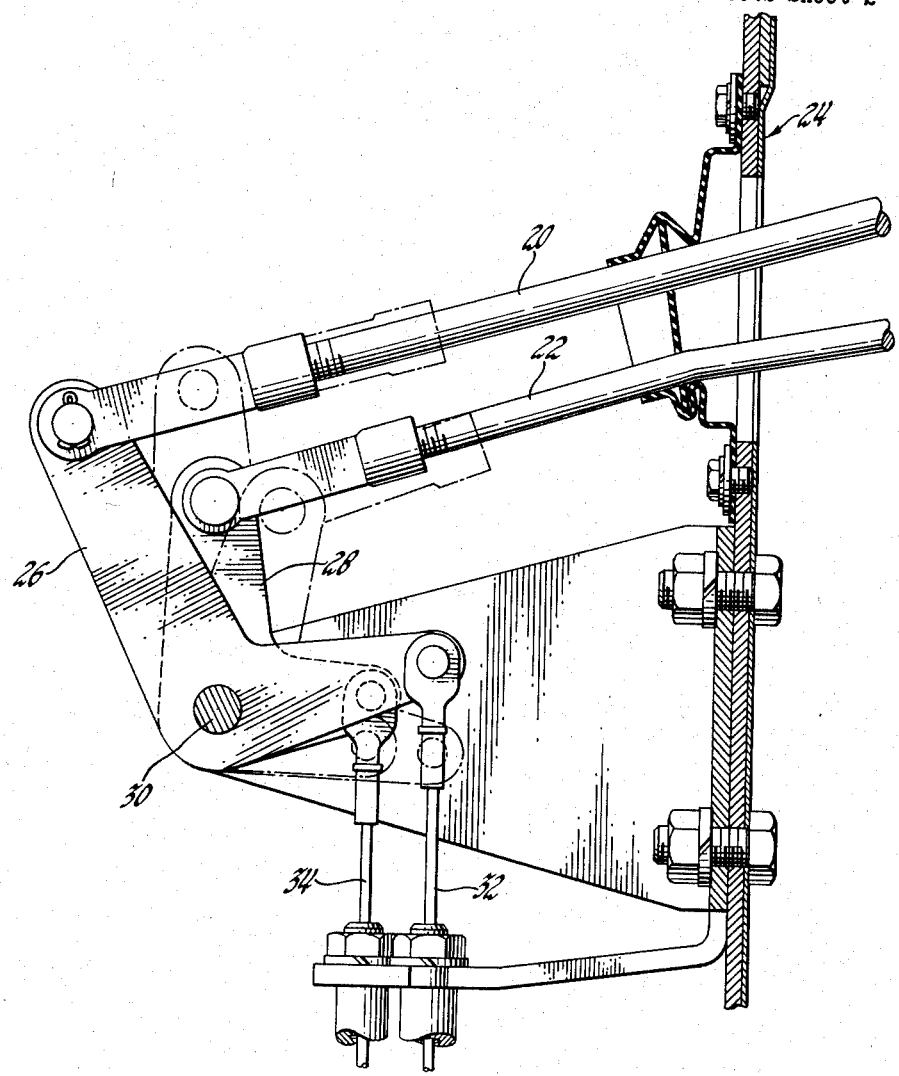

March 1, 1960 — W. C. EDGLEY — 2,926,762
CONTROL MECHANISM
Filed June 4, 1958 — 4 Sheets-Sheet 3
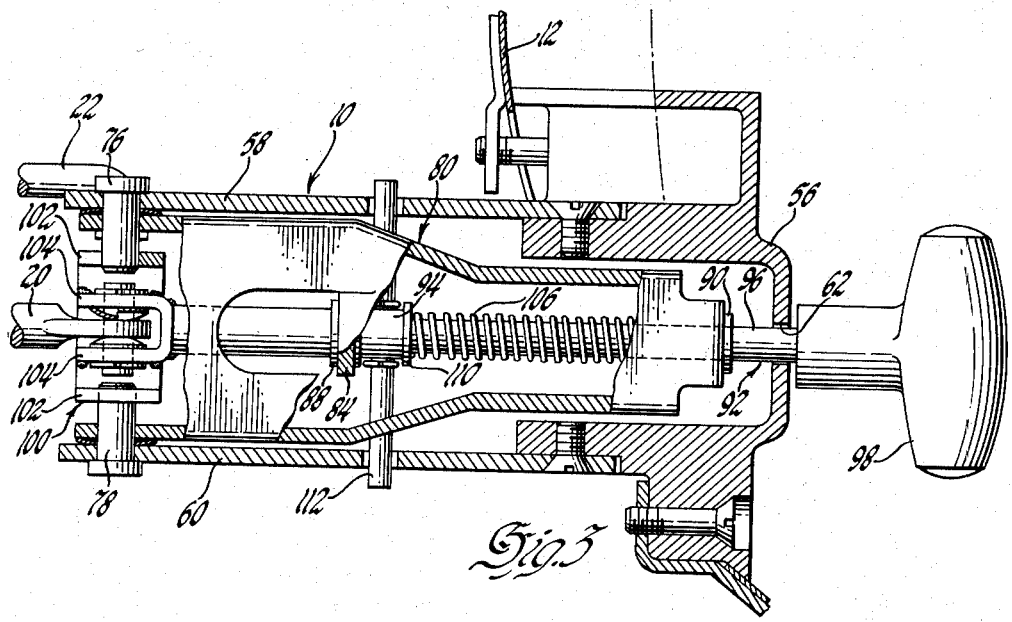
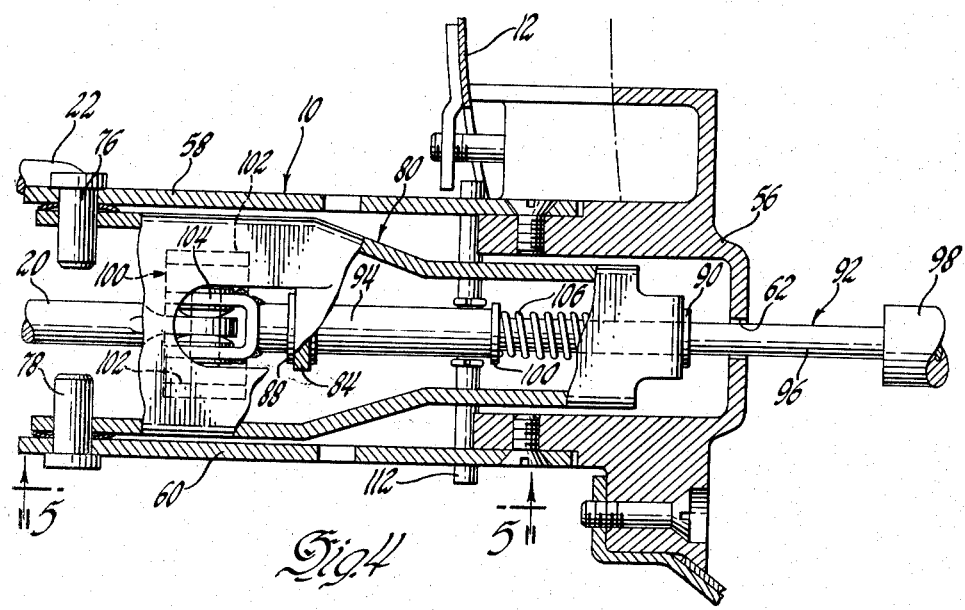
INVENTOR.
William C. Edgley
BY
W. C. Middleton
ATTORNEY March 1, 1960
W. C. EDGLEY
2,926,762
CONTROL MECHANISM
Filed June 4, 1958
4 Sheets-Sheet 4
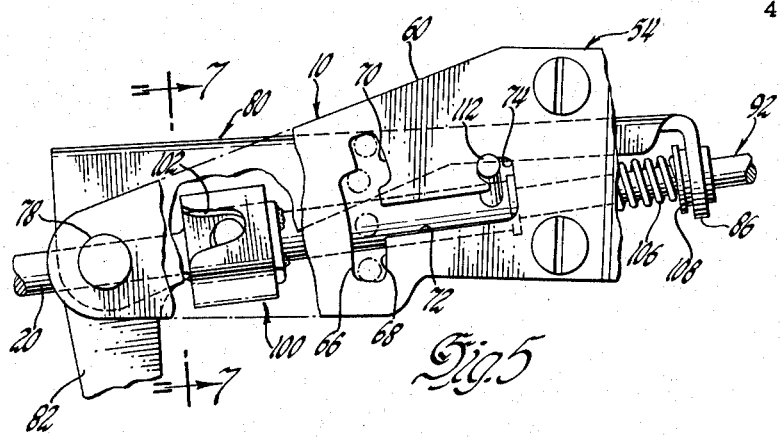
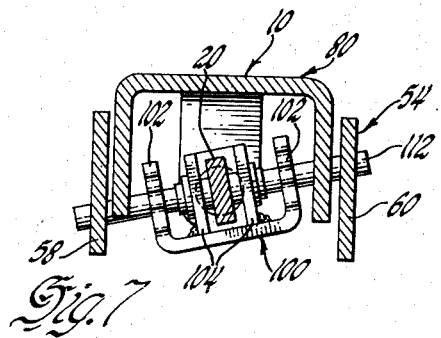
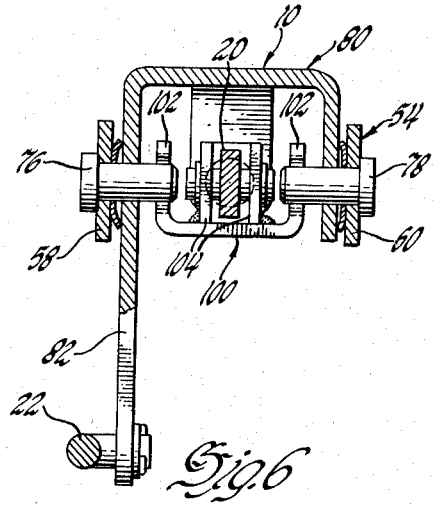
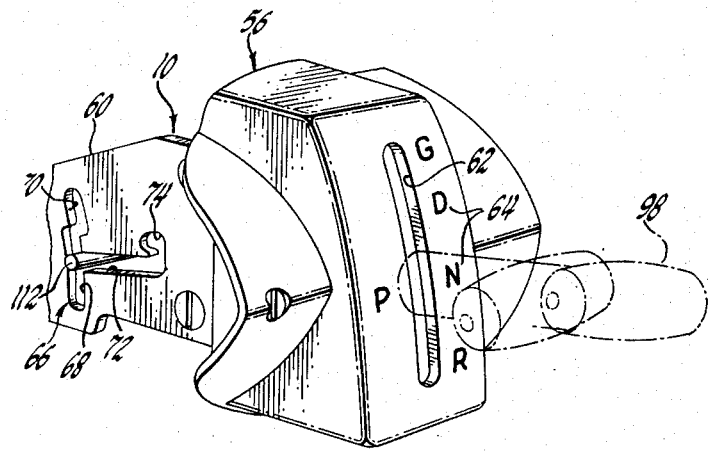
INVENTOR.
William C. Edgley
BY
W. C. Middleton
ATTORNEY

United States Patent Office 2,926,762
Patented Mar. 1, 1960

2,926,762

CONTROL MECHANISM

William Clark Edgley, Davison, Mich., assignor to General Motors Corporation, Detroit, Mich., a corporation of Delaware Application June 4, 1958, Serial No. 739,936

8 Claims. (Cl. 192—4)

This invention relates to control mechanisms, and particularly to plural output control mechanisms suited, although not exclusively, for use with vehicle transmissions.

Control mechanism, such as those for vehicle transmissions, frequently are required to maneuver multiple outputs which extend to external transmission operating levers, or the equivalent. When possible to achieve simplicity, all of the outputs should desirably be operated by one control member, e.g., a knob or handle, made readily accessible to the driver. Moreover, the required operating motions for the control member should not be complicated, but conform to a simple pattern of conventional movements. To accomplish this, such a control mechanism must necessarily translate the conventional control member movements into those required to operate the various output connections to the transmission. Because of this motion translation requirement, the internal components of the mechanism and their operation tend to become somewhat complex. Despite this, the fabrication of each part and its assembly into the unit should preferably conform to mass production techniques. Also, such a control mechanism should be versatile, i.e., be capable of affording the necessary leverage ratios for different applications without a complete redesign.

With the foregoing in mind, the invention seeks to provide a control mechanism that has a single selector for operating plural outputs from the mechanism, that requires simple and conventional movements of the selector for operating the outputs, that has internal translating components which may be easily constructed and assembled according to mass production techniques, that affords positive connections between the selector and the output, and that is adaptable for different leverage ratio installations.

Specifically, the invention contemplates operating a control mechanism of the preceding character by a selector which is pivoted to actuate one output, shifted laterally of the pivotal path to actuate another output, and about the selector axis to lock the control mechanism in one of the positions.

In carrying out the invention according to a preferred embodiment, a mounting bracket is positioned within easy reach of the driver and is provided with spaced side walls and a dial portion with legends corresponding to the various transmission settings. Each of the side walls has a pivot connector and a guide track, the latter being formed with communicating arcuate and substantially straight sections. The straight section of each guide track have offset portions which extend in opposite directions. An actuator member is pivoted on the mounting bracket by the pivot connectors and slidably carries a selector element thereon. The selector element at one end has a knob or handle positionable adjacent the various dial legends and has the other end bifurcated so as to be biasedly urged into engagement with the pivot pins. A cross shaft, carried by the selector element, engages the opposite guide tracks in the mounting bracket side walls, thereby defining movements of the selector element. The selector element is connected at the bifurcated end directly to one output and the actuator member has an arm thereof attached to another output.

When the knob or handle is moved so that the cross shaft traverses the arcuate sections of the guide track, the actuator member is revolved about the pivot connectors and rotates the output connected to the actuator arm. At a selected position the knob or handle can be shifted and as the cross shaft travels along the straight sections of the guide tracks, the output connected directly to the bifurcated end of the selector element will be moved. This shifting movement does not cause the actuator member to be pivoted since the bifurcated end of the selector element disengages from the pivot pins and shifts relative to the actuator member. At the extent of movement of the handle, rotation about its axis will cause the cross shaft to enter the offset portions of each straight section of guide track and lock the mechanism in this latter position.

The foregoing and other objects and advantages of the invention will be apparent from the following description and from the accompanying drawings, in which:

Figure 2a is an enlarged view of linkage bellcranks between the control mechanism and the transmission;

Figure 3 is a sectional view of the control mechanism in the range selecting position, taken along line 3—3 of Figure 2;

Figure 4 is a sectional view, similar to Figure 3, with the control mechanism in the Park position;

Figure 5 is a side elevational view of the control mechanism in the Park position;

Figure 6 is a sectional view of the control mechanism, taken along line 6—6 of Figure 2;

Figure 7 is a sectional view of the control mechanism, taken along line 7—7 of Figure 5; and Figure 8 is a perspective view of the control mechanism showing the dial and handle relationship.

Figure 1:
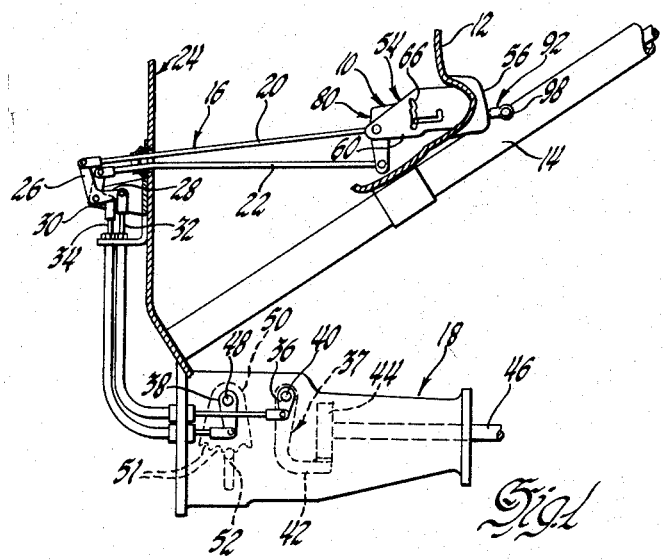
Figure 1 is a side elevational view of a vehicle transmission installed control mechanism embodying the principles of the invention.

Referring to the drawings, and particularly to Figure 1, the numeral 10, designates generally, the control mechanism which is mounted on a vehicle instrument panel 12 adjacent a steering column 14 so as to be not only accessible but easily observed by the driver. Linkage 16, which connects the control mechanism 10 with a transmission 18, includes parking brake and range selector rods 20 and 22, both connected at one end to the control mechanism 10. The opposite ends of these rods 20 and 22, as best shown in Figure 2a, extend through a conventional wall 24 separating the engine (not shown) from the passenger compartment and are adjustably attached, respectively, to the upper ends of bellcrank levers 26 and 28, both pivoted at 30 on the wall 24. The lower ends of the bellcrank levers 26 and 28 are connected, respectively, to parking brake and range selector cables 32 and 34, enclosed by suitable protective covers. Cables 32 and 34 are, in turn, attached at the opposite ends to an operating member or lever 36 for a parking brake, demonstrated generally at 37, and a range selector member or lever 38, both levers being on the outside of the transmission 18.

The parking brake operating lever 36 is connected to the outside end of a shaft 40 which extends inside the transmission. The parking brake 37 has connected at the opposite end of shaft 40 appropriate mechanism (not shown) for operating a pawl 42. Pawl 42 is of the character that engages, in the Park position, mating teeth on a gear wheel 44 joined to the transmission output shaft 46. Hence, in the Park position, the transmission output shaft 46 cannot be revolved.

The range selector lever 38 is attached to the external end of a shaft 48 which extends inside the transmission and operates suitable range selecting mechanism. The range selecting mechanism may include a detent lever 50 of the kind that has a series of notches 51, each corresponding to different transmission operating range positions and being engageable with a conventional spring biased detent 52. The detent lever 50 may operate a valve (not shown) of the type that directs fluid to the appropriate ratio changing units, in a known manner, in the case of a hydraulically controlled transmission or may, if desired, operate mechanical or electrical controls for the same purpose.

Figure 2:
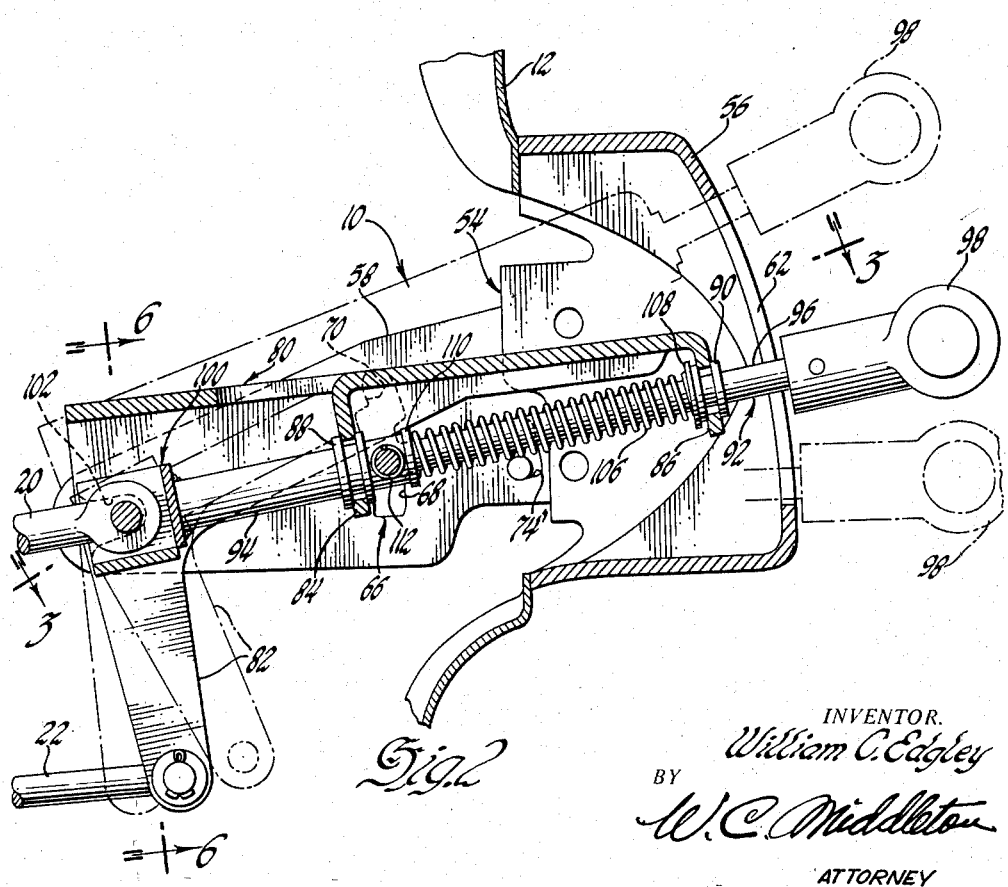
Figure 2 is a sectional view of the control mechanism in the transmission operating range selecting position.

As best depicted in Figures 2 and 8, the control mechanism 10 has a mounting bracket, indicated generally at 54, suitably attached to the instrument panel 12, and is provided with an indicator dial 56 and spaced side walls 58 and 60 extending inside the instrument panel 12. The indicator dial 56 has an upright elongated opening 62 (see Figure 8) with the legends G, D, N and R on the one side denoting, respectively, Grade Retard for engine braking, Forward Drive, Neutral and Reverse Drive positions representing some of the various operating ranges for the transmission. On the opposite side of the opening 62 a legend P is situated directly opposite the Neutral position and corresponds to the Park position for the parking brake 37. Additional legends may be placed on the Park position side of opening 62, if desired. Each of the side walls 58 and 60 of the bracket 54 has guide tracks or irregularly shaped slots, denoted at 66, formed therein comprising identical and oppositely disposed arcuate sections 68 with a slight upward offset at 70 and substantially straight sections 72 extending from a predetermined point along the arcuate sections 68. The end of the straight section 68 in side wall 60 is furnished an upward extending offset 74 and that in side wall 58 with a corresponding offset 74' which extends downwardly, as can be seen in Figure 2.

At the extreme inner ends of the bracket side walls 58 and 60 pivot connectors or pins 76 and 78 are, respectively, attached to be in confronting alignment and pivotally support a channel-shaped actuator member or plate, denoted at 80. The actuator plate 80 includes, at the inner end, an arm 82 of selected length attached to the range selector rod 22 and a pair of spaced ears 84 and 86 which retain, respectively, bearing members 88 and 90. A stepped diameter selector element or rod 92 is slidably supported by the actuator plate 80 and has the large diameter 94 thereof slidable within bearing member 88 and the small diameter 96 thereof slidable within bearing 90. The outer small diameter end of the selector rod 92 extends through dial opening 62 and has attached thereto a knob or handle 98 which is adjacent the legends on the dial 56. At the opposite end the selector rod 92, as viewed in Figures 2, 5 and 6, is provided with a U-shaped bracket 100, the ends of which are bifurcated at 102 and engage the pivot pins 76 and 78 in the depicted position. Flanges 104 on the bracket 100 between the bifurcated ends 102 embrace the end of the parking brake rod 20 and are pinned thereto. As best seen in Figure 2, a coil spring 106 surrounds the small diameter 96 of the selector rod 92 and is positioned between a washer 108 engaging bearing member 90 and a washer 110 which abuts the shoulder separating the large and small diameters 94 and 96. Spring 106 functions to push the selector element 92 to the Figure 2 position with the bifurcated ends 102 engaging the pivot pins 76 and 78. A cross shaft 112, attached or made integral with the selector rod 92, extends transversely thereof and into engagement with the guide tracks 66 in the opposite bracket side walls 58 and 60.

In summarizing the operation of the control mechanism 10, the selection of the transmission operating ranges, indicated by the dial legends G, D, N and R will be described first. Referring to Figure 2, and assuming that the selector handle 98 is in the solid line position corresponding to Neutral, the components of the mechanism 10 will be as depicted with cross shaft 112 stationed in the arcuate sections 68 of the guide tracks 66 adjacent the straight sections 72, also shown by Figure 8. When the handle 98 is moved downwardly to the dotted line position and to the extent of its travel, the cross shaft 112 will engage the bottom of the arcuate section 68 (see Figure 5). The actuator member 80 will be revolved clockwise, as viewed in Figure 2, about the pivot pins 76 and 78 so as to cause arm 82 to move the range selector rod 22 to the left which, in turn, will rotate bellcrank lever 28 counterclockwise about the pivot point 30 and exert a pull on the range selector cable 34. This pull will be transferred to the range selector member 38 revolving it clockwise. When the handle 98 is moved upwardly, e.g., to the Drive position, the actuator member 80 is rotated counterclockwise with a resultant push being exerted on the range selector cable 34, revolving the range selector member 38 counterclockwise.

Since the Grade Retard position or an equivalent is one that is normally only occasionally used, movement of the handle 98 to this position requires a slight pull to be exerted so that the cross pin 112 can move into the offsets 70 of the arcuate sections 68. The offsets 70 prevent an accidental movement of the handle 98 to the Grade Retard position insuring that the driver intends this position to be selected. The slight amount that the handle 98 is pulled will cause the selector rod 92 to be shifted slightly in opposition to the spring 106 and cause a slight disengagement of the bifurcated ends 102 from the pivot pins 76 and 78 and thereby exert a slight pull on the parking brake rod 20. However, this amount is slight and the parking brake rod 20 is not moved far enough to cause the parking brake 37 to be actuated.

To obtain the Park position, the handle 98 is moved to the Neutral position, viewed in Figures 2 and 8, and then pulled outwardly, this being possible since the cross shaft 112, when in the Neutral position, is aligned with the straight sections 72 of the guide tracks 66. The pull on handle 98 will cause the cross shaft 112 to be moved along the straight sections 72 to the end thereof, the spring 106 to be compressed thereby and the bifurcated ends 102 to be disengaged from the pivot pins 76 and 78. This resultant outward movement of the selector rod 92 being relative to the actuator member 80 will not cause any rotation to be transferred thereto due to the confinement of the cross shaft 112 within the straight sections 72 of the guide tracks 66. The outward movement of the handle 98 will, however, cause the parking brake rod 20 to be pulled to the right, as viewed in Figures 1 and 2, and hence, revolve bellcrank lever 26 clockwise about pivot point 30 exerting a push on the parking brake cable 32 which, in turn, will revolve the parking brake operating lever 40 counterclockwise and urge the pawl 42 into engagement with the teeth on the gear wheel 44. As a result, parking brake 37 will be in the engaged or Park position.

Because the spring 106 constantly urges the selector rod 92 back to the Figure 2 position, provision is made for locking the handle 98 in the Park position. This is accomplished, as seen in Figure 8 by revolving the handle 98 about its axis which will, as seen in Figures 5 and 7, cause the cross shaft 112 to engage the opposite offsets 74 and 74' at the ends of the straight sections 72, this rotation being permitted because, as explained, offset 74 in side wall 60 extends upwardly and offset 74' in side wall 58 extends downwardly. The locking aspect of the handle 98 in the Park position insures that the control mechanism 10 has been moved to the Park position and that the driver is aware of this, for, unless locked, the selector rod 92 will be returned by spring 106 to the Figure 2 position preparatory to selecting ranges of transmission operation.

From the foregoing it can be seen, that simple and conventional movements of a handle, namely, turning, pivoting and pulling motions are translated by relatively simply arranged components into motions which operate range selector and parking brake rods. In avoiding complexity, the parts utilized are easily formed by mass production stamping operations and each is easily assembled. Moreover, by the arrangement the leverage can be changed for different installations by altering the length of the actuator arm 82 as required. Also, certain positions, namely, Park and Grade Retard, can only be obtained by extra effort on the part of the driver, insuring against inadvertent or accidental operations.

The invention is to be limited only by the following claims.

I claim:

1. A control mechanism comprising, in combination, a mounting bracket including a dial with a plurality of legends thereon and a guide track with plural sections corresponding to the plurality of dial legends, a selector element in engagement with the guide track, the selector element and the guide track coacting so as to require different movements of the selector element when in different ones of the plural sections of the guide track, and plural outputs arranged to be actuated by the selector element, the selector element when moved to positions denoted by the different dial legends traversing the corresponding sections of the guide track and causing the respective output connections to be actuated.

2. A control mechanism comprising, in combination, a mounting bracket including a dial with a plurality of legends thereon and a guide track with mutiple sections corresponding to the plurality of dial legends, a selector element in engagement with the guide track and having a releasable pivotal connection with the mounting bracket, and plural outputs arranged to be actuated by the selector element, the selector element when moved about the pivotal connection to a position denoted by one of the plurality of dial legends traversing one of the multiple sections of the guide track so as to cause one of the plural outputs to be actuated, the selector element when moved relative to the pivotal connection to another position denoted by another one of the plurality of dial legends traversing another of the multiple sections of the guide track so as to cause another one of the plural outputs to be actuated.

3. A control mechanism comprising, in combination, a mounting bracket including a dial with a plurality of legends thereon and a guide track with curved and substantially straight communicating sections corresponding to the plurality of dial legends, a selector element in engagement with the guide track and having a releasable pivotal connection with the mounting bracket, and plural outputs arranged to be actuated by the selector element, the selector element when moved about the pivotal connection to a position denoted by one of the plurality of dial legends traversing the curved section of the guide track so as to cause one of the plural outputs to be actuated, the selector element when moved relative to the pivotal connection to another position denoted by another one of dial legends traversing the substantially straight section of the guide track so as to cause another one of the plural outputs to be actuated.

4. A control mechanism comprising, in combination, a mounting bracket including a dial with a plurality of legends thereon and a guide track with arcuate and substantially straight communicating sections corresponding to the plurality of dial legends, the guide track substantially straight section having an offset portion, a selector element in engagement with the guide track and having a releasable pivotal connection with the mounting bracket, and plural outputs arranged to be actuated by the selector element, the selector element when rotated about the pivotal connection to a position denoted by one of the plurality of dial legends traversing the arcuate section of the guide track so as to cause one of the plural outputs to be actuated, the selector element when shifted relative to the pivotal connection to another position denoted by another one of the plurality of dial legends traversing the substantially straight section of the guide track so as to cause another one of the plural outputs to be actuated, the selector element when turned about its axis engaging the offset portion of the guide track substantially straight section thereby locking the selector element in said another position.

5. A control mechanism comprising, in combination, a mounting bracket including a dial with a plurality of legends thereon, a guide track with arcuate and substantially straight communicating sections corresponding to the plurality of dial legends, the guide track substantially straight section having an offset portion, and a pivotal connector, an actuator member rotatably supported on the bracket by the pivotal connector, a selector element in engagement with the guide track and being slidably supported on the actuator member, the selector element having one end releasably engaging the pivotal connector and the opposite end adjacent the bracket dial, biasing means urging said one end of the selector element into engagement with the pivotal connector, and plural outputs arranged to be actuated by the selector element, the selector element when rotated about the pivotal connector to a position denoted by one of the plurality of dial legends traversing the arcuate section of the guide track so as to cause one of the plural outputs to be actuated, the selector element when shifted relative to the pivotal connector to another position denoted by another one of the plurality of dial legends traversing the substantially straight section of the guide track so as to cause another one of the plural outputs to be actuated, the selector element when turned about its axis so as to engage the offset portion of the guide track substantially straight section locking the selector element in said another position.

6. A control mechanism for use with a vehicle transmission of the character having a range selector member movable to a plurality of positions for establishing different ranges of transmission operation and a parking brake for preventing in the Park position rotation of the transmission output shaft comprising, in combination, a mounting bracket including a dial with a plurality of legends thereon denoting the different ranges of transmission operation and the Park position of the parking brake, a guide track with communicating arcuate and substantially straight sections corresponding to the plurality of dial legends, and a pivot pin thereon, the substantially straight guide track section having an offset portion, an actuator member rotatably supported on the mounting bracket by the pivot pin, a selector element in engagement with the guide track and being slidably supported on the actuator member, the selector element having one end bifurcated and in engagement with the pivot pin and the opposite end adjacent the bracket dial, a spring for urging the bifurcated end of the selector element into engagement with the pivot pin, and connections, respectively, between the selector element and the parking brake and between the actuator member and the transmission range selector member, the selector element when rotated about the pivot pin to the different ranges of transmission operation positions traversing the arcuate section of the guide track so as to cause the actuator member to be revolved about the pivot pin and through the connection therewith move the range selector member to a corresponding range of transmission operation position, the selector element when shifted relative to the actuator member so as to disengage the pivot pin traversing the substantially straight section of the guide track and causing the parking brake through the connection therewith to be placed in the Park position, the Park position being maintained by turning the selector element about its axis so that the offset portion of the substantially straight guide track section is engaged.

7. A control mechanism for use with a vehicle transmission of the character having a range selector member movable to a plurality of positions including Forward, Neutral and Reverse for establishing different ranges of transmission operation and a parking brake for preventing in the Park position rotation of the transmission output shaft comprising, in combination, a mounting bracket including a dial with a plurality of legends thereon denoting the Forward, Neutral, Reverse, and Park positions, a guide track with arcuate and substantially straight sections corresponding, respectively, to the Forward, Neutral, Reverse positions and the Park position, and a pivot pin thereon, the substantially straight section of the guide track having an offset locking portion, an actuator member rotatably supported on the mounting bracket by the pivot pin, a selector element in engagement with the guide track and being slidably supported on the actuator member, the selector element having one end bifurcated and engaging the pivot pin and the opposite end adjacent the bracket dial, a spring for urging the bifurcated end of the selector element into engagement with the pivot pin, and connections, respectively, between the selector element and the parking brake and between the actuator member and the transmission range selector member, the selector element when rotated about the pivot pin traversing the arcuate section of the guide track so as to cause the dial end of the selector element to assume one of the Forward, Neutral and Reverse positions and thereby through the connection between the actuator member and the range selector member cause the range selector member to be moved to a corresponding position, the selector element when in the position corresponding to the Neutral position on the dial and pulled so that the bifurcated end thereof disengages the pivot pin traversing the straight section of the guide track and through the connection between the selector element and the parking brake causing the parking brake to be placed in the Park position, the Park position being maintained by turning the selector element about its axis so as to engage the offset portion of the straight section of the guide track.

8. A control mechanism for use with a vehicle transmission of the character having a range selector member movable to a plurality of positions including Forward, Neutral and Reverse for establishing different ranges of transmission operation and a parking brake for preventing in the Park position rotation of the transmission output shaft, comprising, in combination, a mounting bracket including a dial with legends thereon denoting the Forward, Neutral, Reverse and Park positions, confronting side walls each including oppositely disposed pivot pins and guide tracks with arcuate and substantially straight sections corresponding, respectively, to the Forward, Neutral, and Reverse positions and the Park position, the substantially straight section of the guide track having oppositely offset portions extending therefrom, an actuator member supported by the pivot pins for rotatable movement relative to the mounting bracket, a selector element slidably mounted on the actuator member and provided with a cross shaft in engagement with the guide tracks in the bracket side walls, the selector element having one end bifurcated and in engagement with the pivot pins and the opposite end provided with a handle disposed adjacent the bracket dial, a spring for urging the selector element into engagement with the pivot pins, and connections, respectively, between the selector element and the parking brake and between the actuator member and the transmission range selector member, the selector element when rotated about the pivot pins to one of the Forward, Neutral and Reverse positions denoted on the dial traversing the arcuate section of the guide track and causing through the connection between the actuator member and the range selector member the range selector member to be moved to a corresponding position, the selector element when in the Neutral position denoted on the dial being shiftable by pulling action so as to traverse the straight section of the guide track disengaging the bifurcated end from the pivot pins so as to cause through the connection between the selector element and the parking brake the parking brake to be placed in the Park position, the Park position being maintained by turning the selector element about its axis so that the cross shaft engages the offset locking portions of the substantially straight section of the guide track.

References Cited in the file of this patent
UNITED STATES PATENTS

| | | |
|---|---|---|
| 905,637 | Beskow | Dec. 1, 1908 |
| 1,285,601 | Blasier | Nov. 26, 1918 |
| 2,653,689 | Hasbany | Sept. 29, 1953 |
| 2,821,090 | McCordic | Jan. 28, 1958 |